July 5, 1966

L. F. JOHNSON ETAL
LIGHT MODULATOR USING A VARIABLE
SPACING DIFFRACTION GRATING
Filed June 30, 1961

3,259,014

INVENTORS L. F. JOHNSON
D. KAHNG
BY
ATTORNEY 3,259,014
LIGHT MODULATOR USING A VARIABLE SPACING DIFFRACTION GRATING
Leo F. Johnson, North Plainfield, and Dawon Kahng, Somerville, N.J., assignors to Bell Telephone Laboratories, Incorporated, New York, N.Y., a corporation of New York
Filed June 30, 1961, Ser. No. 121,139
3 Claims. (Cl. 88—61)

This invention relates to light modulators and more particularly to light modulators employing diffraction apparatus.

The recent invention of the optical maser has made possible the generation of high intensity monochromatic coherent light beams. Such beams may be propagated with extreme directionality and are, therefore, potentially useful in point-to-point communications systems. Optical masers for use in communications are also advantageous in that highly directional beams may be produced without the need for large antenna structures frequently associated with systems utilizing electromagnetic radiation of longer wavelengths. In addition, the enormously high frequencies of optical radiation make possible the transmission of much larger quantities of information than has heretofore been possible with radiation in lower bands of the electromagnetic frequency spectrum. In order to realize the potential of the newly discovered optical masers as communications devices it is necessary that apparatus be provided for modulating light waves at high frequencies.

It is an object of this invention to modulate the amplitude of monochromatic light energy in accordance with high frequency signal information.

The above-mentioned and other objects of the invention are achieved in one illustrative embodiment thereof comprising a piezoelectric member having a diffraction grating on a specular surface thereof. The diffraction grating is characterized by a predetermined grating spacing, so that when a monochromatic beam of parallel light rays is directed thereagainst a diffraction pattern is produced having a plurality of well-defined maxima. A pair of electrodes are provided for applying to the piezoelectric member a modulated oscillatory electric field at a frequency corresponding to a fundamental mechanical resonance thereof. By causing the piezoelectric member to vibrate in a fundamental mode the electric field causes the grating spacing to oscillate correspondingly. As the angle of diffraction for light of a given frequency is dependent on the grating spacing, the maxima of the diffraction pattern are also caused to oscillate about a mean diffraction angle. The maximum angular deviation of the diffraction pattern varies with the amplitude of the modulated oscillatory electric field, hence amplitude modulation of the light is achievable by means responsive to changes in the angle of diffraction.

It is a feature of the invention that the member supporting a diffraction grating is caused to vibrate in a fundamental resonant mode, whereby the characteristic grating constant is caused to oscillate about a mean value.

It is another feature of the invention that the maximum angular deviation of the diffraction pattern is modulated by modulating the amplitude of the grating vibration.

It is a further feature of the invention that the amplitude of a light beam is modulated by modulating the spacing between the lines of a diffraction grating.

These and other objects and features of the invention will be better understood from the following more detailed discussion taken in conjunction with the accompanying drawing in which.

Figure 1:
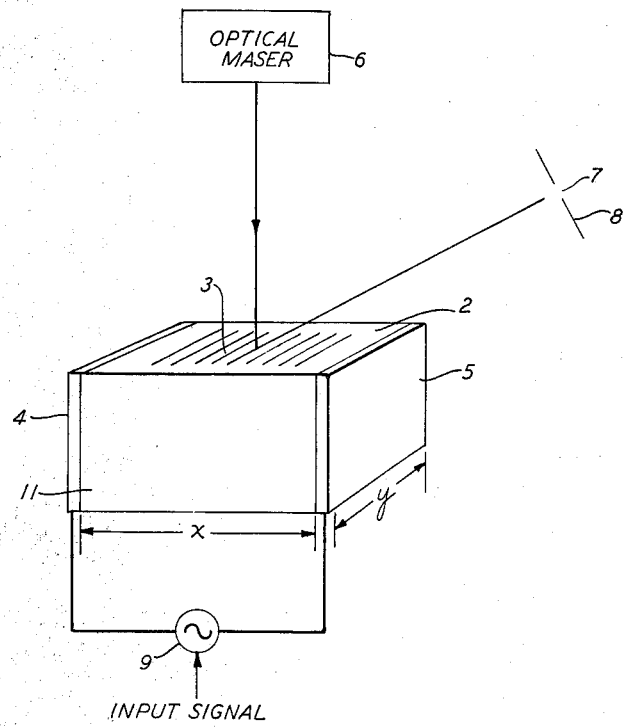
FIG. 1 depicts an illustrative embodiment of the invention.

Turning now to FIG. 1, there is shown a light modulator in accordance with the principles of the invention, comprising a piezoelectric member 1 of a material such as, for example, quartz or barium titanate. A diffraction grating 3 is ruled on a flat specular surface 2 of the member 1. Electrodes 4 and 5 are provided on opposite sides of the member 1 so that, by applying a potential difference therebetween an electric field may be established which extends through the volume of the piezoelectric member 1. An oscillatory electric field, produced by applying to the electrodes 4 and 5 a time-varying potential difference generated by a source 9, subjects the member 1 to oscillatory stresses which drive it to vibrate. In accordance with a feature of the invention, the member 1 is driven to vibrate in a fundamental resonant mode so that time-periodic compression and rarefaction is produced along the length of the grating 3, corresponding to the $x$-dimension of the member 1, whereby the width and spacing of the slits is varied correspondingly.

Now when a monochromatic light beam from a source such as an optical maser 6 is normally incident on the grating a characteristic diffraction pattern is produced. The intensity function I of the pattern is given by (1) $$I = R_o^2 \frac{\sin^2 \beta}{\beta^2} \cdot \frac{\sin^2 N\Gamma}{\sin^2 \Gamma}$$

where $$\beta = \frac{\pi a \sin \theta}{\lambda}$$

$$\Gamma = \frac{\pi d \sin}{\lambda}$$

$a$ = width of slits
$d$ = separation of slits
$\theta$ = angle of diffraction
$\lambda$ = wavelength of light
$R_o$ = constant depending on optical maser intensity
$N$ = number of slits utilized The factor $$\frac{\sin^2 N\Gamma}{\sin^2 \Gamma}$$

represents the interference pattern for light diffracted by N slits, while $$\frac{\sin^2 \beta}{\beta^2}$$

represents the envelope function. The angular dispersion of the principal maxima of the interference pattern is defined by the well-known grating equation (2) $\quad d \sin \theta = n\lambda \quad (n=1, 2 \ldots)$ where $n$ refers to the order of the diffraction.

As $a$ and $d$ change under the influence of the strains produced in the member 1 by the varying electric field, the angular dispersion of the diffraction pattern changes also. Thus, if a principal maximum falls on an aperture 7 in an opaque member 8 when the member 1 is unstrained, the periodic fluctuation of the grating characteristics may be transformed into fluctuations in the amount of light which passes therethrough. As will appear, the width of aperture 7 is advantageously equal to the width of the principal maximum which is directed to it.

Figure 2:
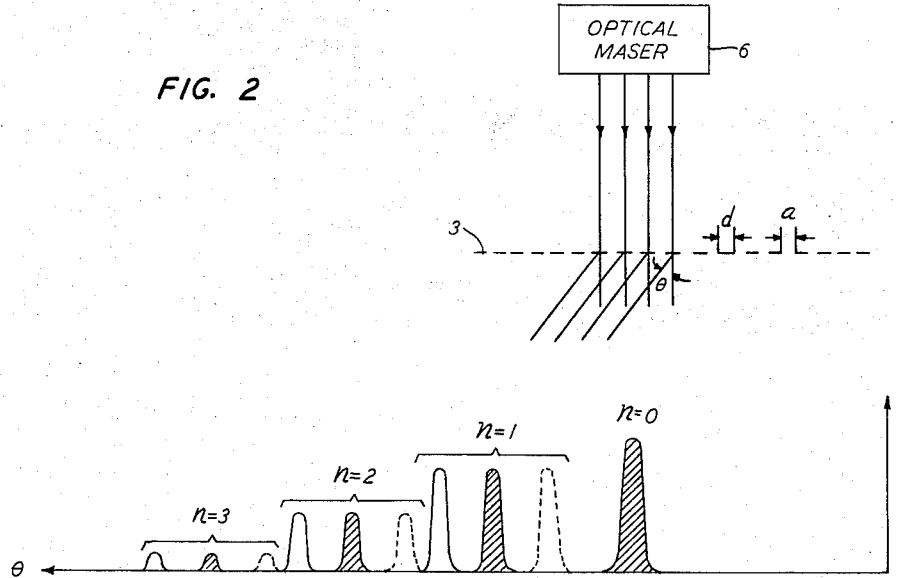
FIG. 2 depicts schematically a diffraction grating and the diffraction patterns corresponding to various values of the grating characteristics.

FIG. 2 illustrates schematically the effect of changes in the grating characteristics on the diffraction angle $\theta$ for light of a given wavelength. A portion of the incident light energy, indicated by the shaded area $n=0$, from source 6 passes through grating 3 without deflection, while higher orders are represented by portions of successively decreasing intensity which are diffracted at successively increasing angle $\theta$. As the member 1 is piezoelectrically stressed to decrease the width and spacing of the slits of grating 3, the diffraction angle $\theta$ increases for each order number, the position of the intensity maxima being represented in the figure by the solid curves. Conversely, as the grating is expanded the maxima are shifted in the opposite direction as shown by the dotted curves.

The change $\Delta\theta$ in the diffraction angle $\theta$ is related to the change $\Delta d$ grating spacing $d$ by Equation 3.

(3) $$\frac{\Delta\theta}{\Delta d}=\frac{-n\lambda}{d^2\left[1-\left(\frac{n\lambda}{d}\right)^2\right]^{1/2}}$$

In order to achieve 100 percent modulation of light of a particular wavelength $\lambda$ the angular displacement $\Delta\theta$ of a principal maximum for a change of grating spacing $\Delta d$ must exceed the angular resolution of the grating. The angular width at half intensity of a principal maximum is given by (4) $$\delta\theta=\frac{\lambda}{Nd\cos\theta}$$

To a good approximation the angular width of the displaced maximum will be the same. Thus, (5) $$\frac{\Delta\theta}{\delta\theta}=Nn\frac{\Delta d}{d}$$

and the strain required to change the grating spacing sufficiently to shift the first order maximum off a slit having the same angular width is (6) $$\frac{\Delta d}{d}=\frac{2}{N}$$

Although it appears from (6) that N should be as large as possible it is important to note that at the same time the width $y$ of the member 1 should be as small as possible since this dimension determines the fundamental resonant frequency and the modulation bandwidth which may be achieved.

It can be shown the modulation bandwidth is, to a good approximation, given by (7) $$\Delta f = k f_R$$

where $k$ is the electromechanical coupling factor and $f_R$ is the fundamental resonant frequency of member 1. The coupling factor $k$ is large within the resonant band, and falls off rapidly outside it. In addition, the efficiency of coupling at resonance makes it possible to drive the member 1 with less power than would otherwise be required.

Consider an optical maser beam having a wavelength of $0.7\mu$ and a diameter of 0.1 centimeter, which is normally incident on a grating having 1000 lines/mm. From (6), it is required that $$\frac{\Delta d}{d}=2\times10^{-3}$$

for 100 percent modulation. Such a strain may be produced in barium titanate, for example, in the longitudinal thickness mode with fields of about 10,000 volts/cm. superimposed on a direct current bias field of 10,000 volts/cm. The fundamental resonance frequency is about 1.2 megacycles and $k=0.5$. If the size of the beam and the grating are reduced by a factor of 10 the bandwidth is increased accordingly, although at the expense of a decrease in modulation to 10 percent.

Thus it can be seen that, in accordance with the invention the characteristics of a diffraction grating may be periodically varied in time by causing its support members to vibrate in an appropriate fundamental resonant mode. Amplitude modulation of light is then achieved with the aid of apparatus responsive to deviation of the angle of diffraction about a mean value, with bandwidth being dependent on both the resonant frequency of the grating and the electromechanical coupling factor.

While the invention has been described herein with reference to a specific illustrative embodiment, other arrangements may be devised by those skilled in the art without departing from its spirit and scope.

What is claimed is:

1. Light modulating apparatus comprising a piezoelectric member having on a surface thereof an optical diffraction grating characterized by a predetermined grating spacing, means for projecting a beam of light to be modulated onto said grating thereby producing a diffraction pattern, means for applying to said member a modulated oscillatory electric field for causing said member to vibrate in a fundamental resonant mode, the frequency of said field being substantially equal to the fundamental natural resonance of said member, thereby producing corresponding oscillatory changes in the grating spacing and consequently in the diffraction pattern, means for modulating said oscillatory electric field, and output means responsive to the modulation of said oscillatory changes of the diffraction pattern.

2. Apparatus as in claim 1 wherein said light beam to be modulated is substantially monochromatic and said output means comprises an opaque member having a light transmissive aperture.

3. Apparatus as in claim 2 wherein the first order maximum of said diffraction pattern is coincident with the center of said aperture, the width of said aperture being substantially equal to the width of said first order maximum.

References Cited by the Examiner

UNITED STATES PATENTS 2,929,242  3/1960  Bell _____ 88—14
2,936,381  5/1960  Long _____ 88—14

JEWELL H. PEDERSEN, *Primary Examiner.*

EMIL G. ANDERSON, *Examiner.*

R. L. WIBERT, *Assistant Examiner.*